March 10, 1964   A. C. SAMPIETRO ETAL   3,124,735
MEANS FOR OBTAINING SINGLE PHASE AND MULTI-PHASE CURRENTS
FOR OPERATING ALTERNATING CURRENT MOTORS
Filed Sept. 27, 1960   3 Sheets-Sheet 1
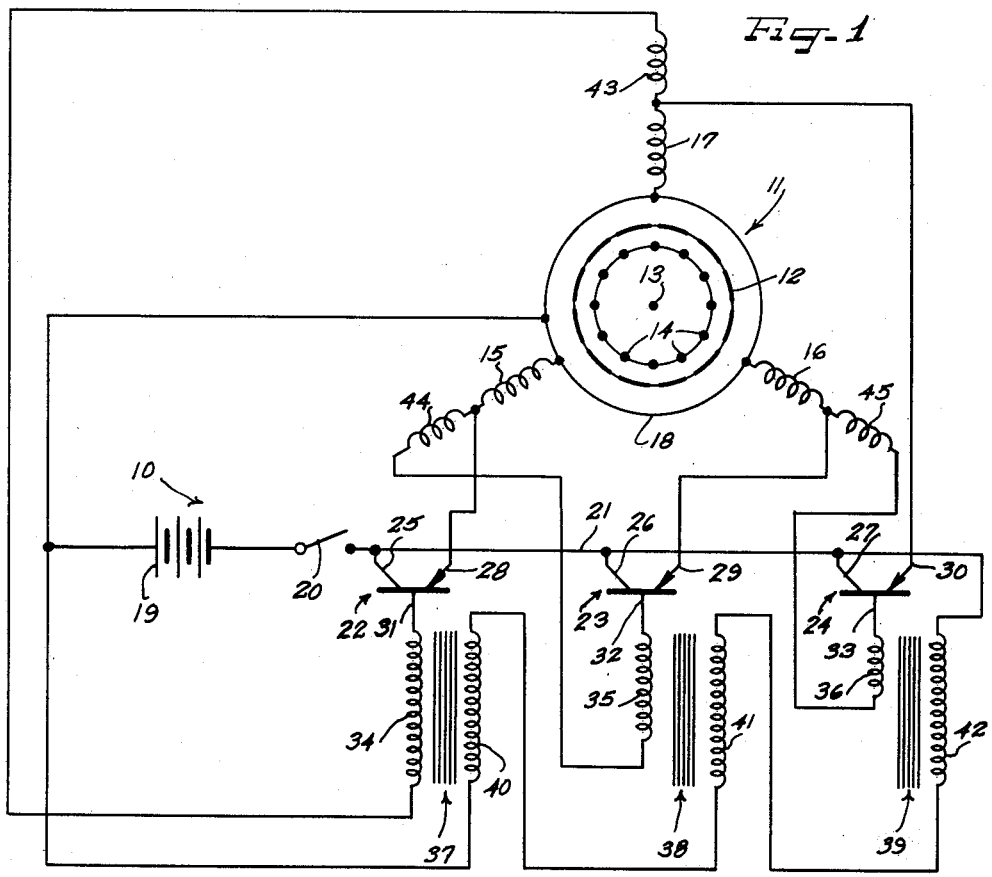
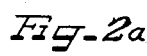  
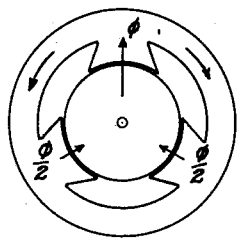 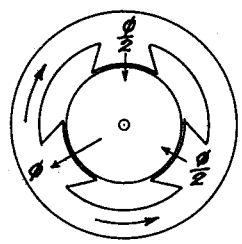 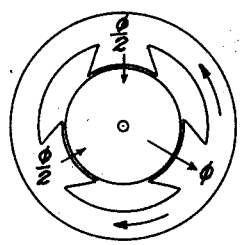
INVENTORS
Achilles C. Sampietro
John D. Grigsby
BY
ATTORNEYS March 10, 1964   A. C. SAMPIETRO ETAL   3,124,735
MEANS FOR OBTAINING SINGLE PHASE AND MULTI-PHASE CURRENTS
FOR OPERATING ALTERNATING CURRENT MOTORS
Filed Sept. 27, 1960   3 Sheets-Sheet 2

INVENTOR.
Achilles C. Sampietro
John D. Grigsby
BY
ATTORNEYS

March 10, 1964  A. C. SAMPIETRO ETAL  3,124,735
MEANS FOR OBTAINING SINGLE PHASE AND MULTI-PHASE CURRENTS
FOR OPERATING ALTERNATING CURRENT MOTORS
Filed Sept. 27, 1960  3 Sheets-Sheet 3

INVENTOR.
Achilles C. Sampietro
John D. Grigsby
BY
ATTORNEYS

United States Patent Office 3,124,735
Patented Mar. 10, 1964

3,124,735
MEANS FOR OBTAINING SINGLE PHASE AND MULTI-PHASE CURRENTS FOR OPERATING ALTERNATING CURRENT MOTORS
Achilles C. Sampietro, Birmingham, Mich., and John D. Grigsby, Willoughby, Ohio, assignors to Thompson Ramo Wooldridge Inc., a corporation of Ohio
Filed Sept. 27, 1960, Ser. No. 58,810
10 Claims. (Cl. 318—138)

This invention relates to single and multi-phase alternating current circuits, and is particularly directed to means for generating single and multi-phase alternating currents at relatively high power levels using a unidirectional voltage source, and to electric motors better suited to utilize these currents. Such circuits have numerous applications in the commercial and military fields, of course, since they can be used to drive numerous loads from a battery.

Accordingly, it is an important object of the present invention to provide an apparatus for generating single or multi-phase alternating currents using a unidirectional voltage source.

It is another important object of this invention to provide a multi-phase alternating current generator which is especially suited for driving multi-phase induction motors.

It is another object of this invention to provide an electric motor construction.

It is another important object of this invention to provide an alternating current generator for driving a linear motor using a unidirectional voltage source.

It is still another object of this invention to provide an alternating current source for driving a linear motor in an audio horn of the type generally used in road vehicles.

Other objects, features and advantages of the present invention will be apparent from the following detailed description taken in conjunction with the accompanying figures of the drawings, in which:

FIGURE 1 is a schematic illustration of a multi-phase induction motor utilizing means for generating multi-phase alternating currents in accordance with the invention;

FIGURES 2a, 2b and 2c illustrate the magnetic flux fields in the motor shown in FIGURE 1 at three different instances in time;

As shown on the drawings:

Figure 3:
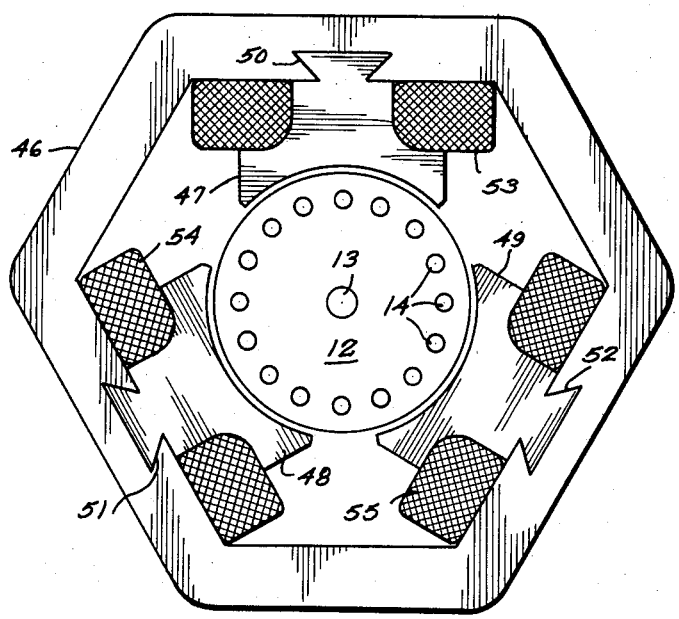
FIGURE 3 illustrates an alternating current motor constructed in accordance with one embodiment of the invention.

FIGURE 1 illustrates an apparatus 10 for generating multi-phase currents and an electric motor 11 adapted to utilize these currents. The alternating current motor 11 includes a rotor 12 which may have a conventional squirrel cage rotor type construction. This rotor is rotatably mounted about an axis 13 and has a plurality of conductors 14 mounted thereon which are tied together at each end in the usual manner.

Mounted on the stator assembly for the motor are three field windings 15, 16 and 17 which are connected together at one end by a conductor 18. Their other ends are connected to the apparatus 10 for generating multi-phase currents so that, during operation, these currents flow through the windings 15–17 and cause the rotor 12 to rotate about the axis 13.

The apparatus 10 includes a battery 19 that is connected in series with an on-off switch 20 and a bus bar 21. The positive terminal of the battery 19 is connected to the conductor 18 on the stator assembly for the motor. The apparatus 10 also includes three PNP transistors 22, 23 and 24. Their collector electrodes 25, 26 and 27 are connected to the bus bar 21, their emitter electrodes 28, 29 and 30 are connected to the field windings 15, 16 and 17, respectively, and their base electrodes 31, 32 and 33 are connected to the main windings 34, 35 and 36, respectively, of three saturable iron core reactors 37, 38 and 39. The main windings 34, 35 and 36 of these three reactors are also connected through three control or feedback windings 43, 44 and 45, respectively, to the three field windings 17, 15 and 16. The control windings 40, 41 and 42 of these three reactors 37, 38 and 39 are connected in series between the positive terminal of the battery 19 and the bus bar 21. The feedback windings 43, 44 and 45 are also mounted on the stator and are inductively coupled with the windings 15, 16 and 17.

The inductances of the windings 34, 35 and 36 of the three reactors are chosen such that the winding 36 will cause a time delay $t$, the winding 35 will cause a time delay $3t$, and the winding 34 will cause a time delay $2t$. Therefore, when the switch 20 is initially closed currents will build up in the windings 34, 35 and 36 at different rates and the transistor 24 will be triggered to conduction first. Current then flows through the transistor 24 and the field winding 17 at a rapid rate and sets up a magnetic field in the motor which is represented schematically in FIGURE 2a. This flux has an assumed value of $\phi$ and flows out of the winding 17 pole around the stator frame and returns through the poles for the windings 15 and 16. The flux in the windings 15 and 16 poles will each be one half of the flux in the winding 17 pole and this flux flowing through the feedback windings 44 and 45 into the rotor will induce voltages which bias the transistors 23 and 24 to cut-off. The magnetic flux flowing in the opposite direction through the feedback winding 43 will induce a voltage which biases the transistor 22 to conduction and causes current to flow through this transistor and the winding 15 at a faster rate.

The magnetic field set up by the current flowing through the winding 15 is represented by FIGURE 2b and biases the transistors 22 and 24 to cut-off and the transistor 23 to conduction. This action sets up the magnetic field represented by FIGURE 2c. It can be seen that as this action continues a magnetic field is developed in the stator and the rotor which rotates in a counterclockwise direction.

When the switch 20 is initially closed currents also build up in the control windings 40, 41 and 42 which are connected across the positive terminal of the battery 19 and the bus bar 21. The circuit constants are chosen so that by the time the motor has nearly reached its steady state operation the currents through the three windings 40, 41 and 42 will be at their maximum values and the iron cores will be saturated. When this condition is attained the windings 34, 35 and 36 will have a negligible effect on the operation of the motor.

The inductance of the winding 36 may be included in the inductance of the winding 45, and the windings 34 and 35 may be designed accordingly.

Figure 4:
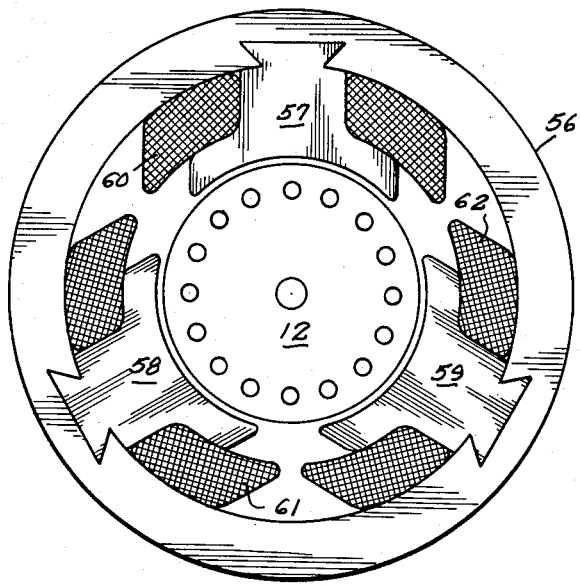
FIGURE 4 illustrates an alternating current motor constructed in accordance with another embodiment of the invention.

FIGURES 3 and 4 illustrate two constructions of the motor 11. With reference to FIGURE 3, the frame 46 of the stator is mounted around the rotor 12 and has three poles 47, 48 and 49 mounted thereon. These poles are preferably made of laminations of a magnetic material which are assembled separately from the stator and dovetailed at 50, 51 and 52 to the frame.

Three coils 53, 54 and 55 are mounted on the poles 47, 48 and 49, respectively. Each of these three coils is made up of two separate parts, the two parts being the main field windings 15, 16 and 17 and the feedback windings 43, 44 and 45 in FIGURE 1. These windings are connected to the apparatus 11 for generating the multiphase currents by suitable input terminals which are normally mounted on the stator frame 46.

The motor shown in FIGURE 4 is similar to the motor shown in FIGURE 3. Its stator frame 56 has a circular construction, however, rather than a polygonal in order to save space. The poles 57, 58 and 59 and their associated coils 60, 61 and 62 have been given arcuate constructions for the same reason.

Figure 6:
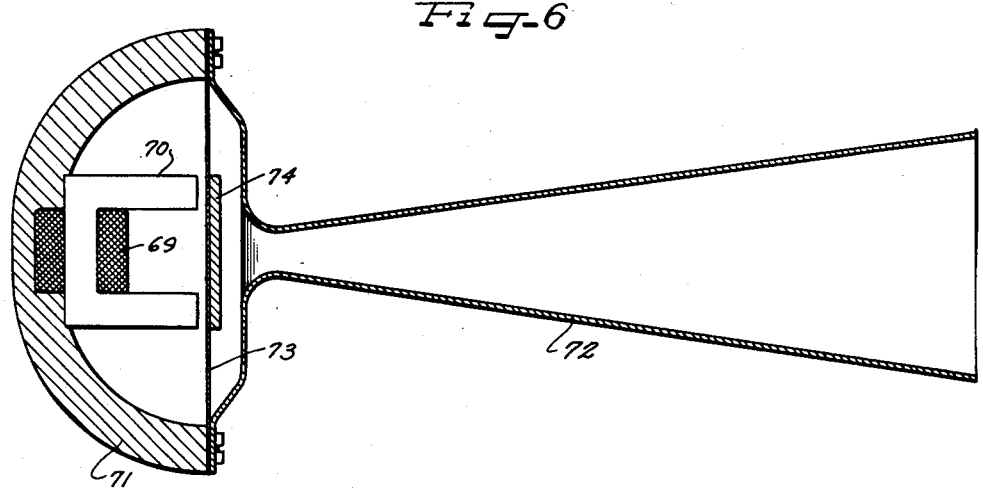
FIGURE 6 illustrates an improved horn having a linear motor that is driven by the circuit shown in FIGURE 5.
Figure 5:
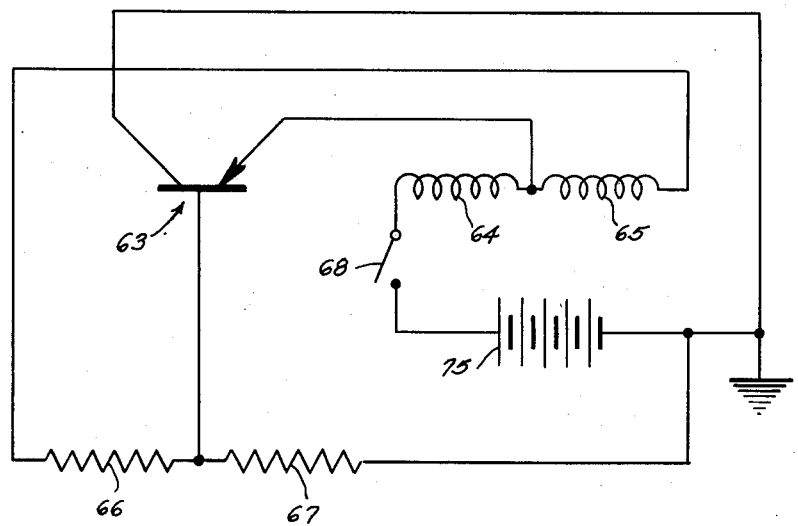
FIGURE 5 illustrates a circuit constructed in accordance with the invention for generating single phase alternating current for a linear motor.

With reference to the embodiment of the invention illustrated in FIGURES 5 and 6, a source of single phase alternating current is illustrated which includes a battery 75, a transistor 63, two inductively coupled windings 64 and 65 and two resistors 66 and 67. The base electrode of the transistor 63 is connected between the resistors 66 and 67, the emitter electrode is connected between the windings 64 and 65, and the collector electrode is connected to the negative potential terminal of the battery 75. The positive potential terminal of the battery 75 is connected through a switch 68 which is connected to one side of the field winding 64. The winding 65 is connected to one side of the resistor 66, and the negative potential terminal of the battery 75 is also connected to ground and one side of the resistor 67.

In operation, when the switch 68 is closed current flows along the path defined by the windings 64 and 65, the resistors 66 and 67, and the battery 75. The magnitude of this current will be relatively small and will cause the base electrode of the transistor 63 to have a negative potential relative to the emitter electrode, with the result that this transistor is biased to its conducting state. When the transistor 63 conducts current flows from the battery 75 through the switch 68, the winding 64 and the transistor 63. Since the windings 64 and 65 are inductively coupled, the current building up in the winding 64 induces a voltage in the winding 65 which is connected to the base electrode of the transistor 63 in such a manner as to bias this transistor toward saturation. The current flowing through transistor 63 continues to increase until the flux in the iron field saturates causing a reversal of polarity of the voltage induced in feedback or control winding 65 which turns transistor 63 off. The flux in the iron then collapses keeping transistor 63 biased off until the voltage induced in the feedback winding equals the voltage at the base of transistor 63 caused by the resistors 66 and 67. At this time the transistor 63 is again forward biased and begins to conduct. This cycle continues to repeat thus sustaining the oscillations.

When this circuit is connected to drive a horn of the type illustrated in FIGURE 6, the windings 64 and 65 are combined in a coil 69 that is wound around the bight portion of a U-shaped laminated magnetic core 70. The coil 69 and the core 70 are mounted on a frame 71 which is made of a non-magnetic material and is attached to a trumpet 72. Positioned between the trumpet 72 and the frame 71 is a flexible diaphragm 73 that has a plate 74 of magnetic material fastened thereto. The alternating current in the winding 64 generates a magnetic field which passes through the core 70 and the plate 74. This alternating field causes the diaphragm 73 and the plate 74 to vibrate which in turn causes the column of air in the trumpet 72 to vibrate and generate acoustic waves. The shape and the length of the trumpet 72 can be varied to produce a desired quality of sound for any given frequency of vibration of the membrane 73.

It can be seen that a horn constructed in this manner possesses many advantages over conventional horns. Usually a set of points are required which make and break the current passing through the exciting coil. Since a horn constructed in accordance with this invention does not require such points, there is less danger of a malfunction and the flexible membrane 73 can be made lighter and operate at higher frequencies with less power because it does not have to operate the breaker mechanism for the points.

Unlike the structure of our prior copending applications, Serial No. 789,601 (now U.S. Patent No. 2,994,026) and No. 35,053, none of the phase windings hereof is connected directly across the D.C.-sources 19 and 75. In FIGURE 1, each of the windings 15, 16, and 17 is respectively connected to the negative side of the source 19 through transistors 22, 23, and 24. In FIGURE 5, the winding 64 is similarly connected to the negative side of the source 75 through the transistor 63. The alternate path through the inductively coupled control or feedback winding 65, and the resistors 66 and 67, is of such high impedance as to provide a proper control potential at the transistor base terminal while allowing no current to flow through the winding 64 of a magnitude which could perform any useful work in this system.

It will be apparent that many modifications and variations may be effected without departing from the scope of the novel concepts of the present invention.

We claim as our invention:

1. An electric motor system comprising:
   (a) a rotatably mounted rotor;
   (b) a stator mounted adjacent to said rotor;
   (c) a plurality of field windings mounted on said stator, and each constructed to be connected at one side to one polarity of a D.C.-power source;
   (d) a plurality of trigger devices respectively operative to connect the other side of all of said field windings to the opposite polarity of such D.C.-power source;
   (e) a plurality of separate electrical impedance means; and
   (f) a plurality of control windings respectively inductively coupled with each of said field windings, and respectively connected through one of said impedance means to that one of said trigger devices associated with the next succeeding field winding.

2. An electric motor system comprising:
   (a) a rotatably mounted rotor;
   (b) a stator mounted adjacent to said rotor;
   (c) a plurality of field windings mounted on said stator, and each constructed to be connected at one side to one polarity of a D.C.-power source;
   (d) a plurality of trigger devices respectively operative to connect the other side of said field windings to the opposite polarity of such D.C.-power source;
   (e) a plurality of saturable iron core reactors each having a reactor control winding constructed to be connected to such D.C.-power source, and a main winding; and
   (f) a plurality of control windings respectively inductively coupled with each of said field windings, and respectively connected through one of said main reactor windings to that one of said trigger devices associated with the next succeeding field winding.

3. An electric motor system comprising:
   (a) a movable member;
   (b) a stator mounted adjacent to said movable member;
   (c) field winding means mounted on said stator, and constructed to be connected at one side to one polarity of a D.C.-power source;
   (d) a number of transistors corresponding to the number of such field windings, each having an emitter connected to the other side of one such field winding, a collector constructed to be connected to the opposite polarity of such D.C.-power source, and a base, all such field windings being so connected;
   (e) separate electrical impedance means; and
   (f) control winding means inductively coupled with said field winding means and directly connected at one end to said emitter, and connected at the other end through said impedance means to the base of one such transistor.

4. An electric motor system comprising:
(a) a rotatably mounted rotor;
(b) a stator mounted adjacent to said rotor;
(c) only three field windings mounted on said stator, and each constructed to be connected at one side to one polarity of a D.C.-power source;
(d) three trigger devices respectively operative to connect the other side of said field windings to the opposite polarity of such D.C.-power source;
(e) three separate electrical impedance means; and
(f) three control windings respectively inductively coupled with each of said field windings, and respectively connected through one of said impedance means to that one of said trigger devices associated with the next succeeding field winding.

5. An electrical system comprising:
(a) a motor having a movable member, a stator mounted adjacent to said movable member, and field winding means inductively coupled with said stator;
(b) a unidirectional voltage source having a first polarity connected directly to said motor only at one side of said field winding means;
(c) trigger circuit means, operative when triggered to connect the other side of said field winding means to said voltage source at a second polarity, and comprising the sole efficient current conducting path between said other side of said field winding means and said voltage source;
(d) separate electrical impedance means; and
(e) control winding means directly connected at one end to said other side of said field winding means, and connected at the other end through said impedance means to said trigger circuit means, and inductively coupled with said field winding means for conducting a triggering potential to said trigger circuit means.

6. An electrical system comprising:
(a) a motor having a movable member, a stator mounted adjacent to said movable member, and field winding means inductively coupled with said stator;
(b) a unidirectional voltage source having a first polarity connected directly to said motor only at one side of said field winding means;
(c) trigger circuit means, operative when triggered to connect the other side of said field winding means to said voltage source at a second polarity, and comprising the sole efficient current conducting path between said other side of said field winding means and said voltage source;
(d) separate iron core reactance means comprising main reactance winding means and reactance control winding means;
(e) motor control winding means directly connected at one end to said other side of said field winding means, and connected at the other end through said main reactance winding means to said trigger circuit means, and inductively coupled with said field winding means for conducting a triggering potential to said trigger circuit means; and
(f) means connecting said reactance control winding means to said unidirectional voltage source to be energized thereby.

7. An electrical system for driving an acoustic wave generating device having a flexible diaphragm comprising:
(a) a stator comprising a magnetic core adapted to be mounted adjacent to said flexible diaphragm;
(b) a movable member adapted to be mounted on said flexible diaphragm adjacent to said core;
(c) field winding means mounted on said core and inductively coupled therewith;
(d) a unidirectional voltage source having a first polarity connected directly to said system only at one side of said field winding means;
(e) trigger circuit means, including a trigger device operative when triggered to connect the other side of said field winding means to said voltage source at a second polarity, and comprising the sole efficient current conducting path between said other side of said field winding means and said voltage source;
(f) separate electrical impedance means; and
(g) control winding means directly connected at one end to said other side of said field winding means, and connected at the other end through said impedance means to said trigger circuit means, and inductively coupled with said field winding means for conducting a triggering potential to said trigger device of said trigger circuit means.

8. An electrical system for driving an acoustic wave generating device having a flexible diaphragm, comprising:
(a) a motor having
(1) a movable member constructed to be mounted on said flexible diaphragm,
(2) a stator comprising a magnetic core mounted adjacent to said movable member, and
(3) field winding means mounted on said core and inductively coupled therewith, and constructed to be connected at one side thereof to one polarity of a D.C.-power source;
(b) trigger circuit means connected to the other side of said field winding means and operative when triggered to connect such other side of said field winding means to the opposite polarity of such D.C.-power source, and to supply fluctuating electrical energy to such field winding means;
(c) separate electrical impedance means; and
(d) control winding means having an end connected directly to said field winding means and inductively coupled with said field winding means, and further connected at the opposite end through said separate electrical impedance means to said trigger circuit means to trigger the same.

9. A linear electric motor system for driving an acoustic wave generating device comprising:
(a) a flexible diaphragm;
(b) a motor having
(1) a stator comprising a magnetic core mounted adjacent to said flexible diaphragm,
(2) a movable magnetic member mounted on said flexible diaphragm adjacent to said core, and
(3) a field winding mounted on said core and inductively coupled therewith;
(c) a trigger circuit connected to said field winding and operative when triggered to supply fluctuating electrical energy thereto, said trigger circuit comprising a trigger device;
(d) a unidirectional voltage source connected in series with said trigger device and said field winding;
(e) electrical impedance means; and
(f) a control winding having an end connected directly to said field winding, and inductively coupled with said field winding, and further connected at the opposite end through said separate electrical impedance means to said trigger device to trigger the same.

10. An electric motor system comprising a rotor, a polygonal stator having three poles mounted adjacent to said rotor, a field winding mounted on each of said poles, a trigger circuit for each of said poles and respectively connected to supply fluctuating electrical energy to each of said field windings, a control winding mounted on each of said poles and inductively coupled with said field windings, each of said control windings being connected to trigger the trigger circuit for the field winding on the next succeeding pole, a unidirectional voltage source connected to supply energy to said field windings through said trigger circuits, and variable reactance means connected to said trigger circuits for initially varying the time between the triggering of said trigger circuits, said variable reactance means being connected to be energized by said unidirectional voltage source.

References Cited in the file of this patent

UNITED STATES PATENTS

| | | |
|---|---|---|
| 2,994,026 | Sampietro | July 25, 1961 |
| 3,083,326 | Deming | Mar. 26, 1963 |

OTHER REFERENCES

"Magnetic Amplifiers," Navy Department, Navships 900,172, 1951. For sale by Superintendent of Documents, U.S. Government Printing Office, Washington 25, D.C.